United States Patent
Monereau

[11] Patent Number: 6,099,618
[45] Date of Patent: Aug. 8, 2000

[54] PROCESS AND PLANT FOR SEPARATING A GAS MIXTURE BY ADSORPTION

[75] Inventor: Christian Monereau, Paris, France

[73] Assignee: L'Air Liquide, Societe Anonyme pour l'Etude et l'Exploitation des Procedes Georges Claude, Paris Cedex, France

[21] Appl. No.: 09/263,831

[22] Filed: Mar. 8, 1999

[30] Foreign Application Priority Data

Mar. 6, 1998 [FR] France .................. 98 02785

[51] Int. Cl.[7] .............................. B01D 53/053
[52] U.S. Cl. .............. 95/101; 95/102; 95/105; 95/130; 96/130; 96/144
[58] Field of Search .......... 95/96–98, 100–105, 95/130; 96/130, 143, 144

[56] References Cited

U.S. PATENT DOCUMENTS

| | | | |
|---|---|---|---|
| 3,738,087 | 6/1973 | McCombs | 95/98 |
| 4,015,956 | 4/1977 | Münzner et al. | 95/96 |
| 4,295,863 | 10/1981 | Lattuada | 55/21 |
| 4,576,614 | 3/1986 | Armond et al. | 95/96 X |
| 4,925,461 | 5/1990 | Gemba et al. | 95/98 |
| 4,969,935 | 11/1990 | Hay | 95/98 |
| 5,015,271 | 5/1991 | Reiss | 95/96 X |
| 5,114,441 | 5/1992 | Kanner et al. | 95/98 |
| 5,122,164 | 6/1992 | Hirooka et al. | 95/98 X |
| 5,223,004 | 6/1993 | Etéve et al. | 95/98 |
| 5,232,473 | 8/1993 | Kapoor et al. | 95/101 |
| 5,248,322 | 9/1993 | Kumar | 95/101 |
| 5,429,666 | 7/1995 | Agrawal et al. | 95/101 |
| 5,518,526 | 5/1996 | Baksh et al. | 95/100 |

FOREIGN PATENT DOCUMENTS

| | | |
|---|---|---|
| 0 689 862 | 1/1996 | European Pat. Off. . |
| 2 750 888 | 1/1998 | France . |
| 04011919 | 1/1992 | Japan . |
| 2 053 020 | 2/1981 | United Kingdom . |

*Primary Examiner*—Robert H. Spitzer
*Attorney, Agent, or Firm*—Young & Thompson

[57] ABSTRACT

This process uses a pressure variation cycle, in which, at at least one instant in the cycle, a terminal of a compression machine (1, 3) is switched from a first space (A1) which is at a first pressure P1 to a second space (A2) which is at a pressure P2 significantly different from P1. The switching comprises an intermediate operation in which the terminal is brought simultaneously into communication with the first space and with the second space. The process is useful in the production of oxygen from atmospheric air by adsorption.

16 Claims, 8 Drawing Sheets

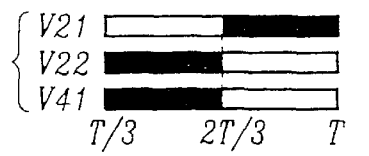 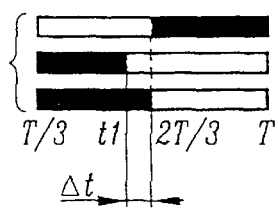 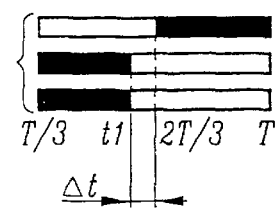
FIG.4　　　　FIG.4A　　　　FIG.4B
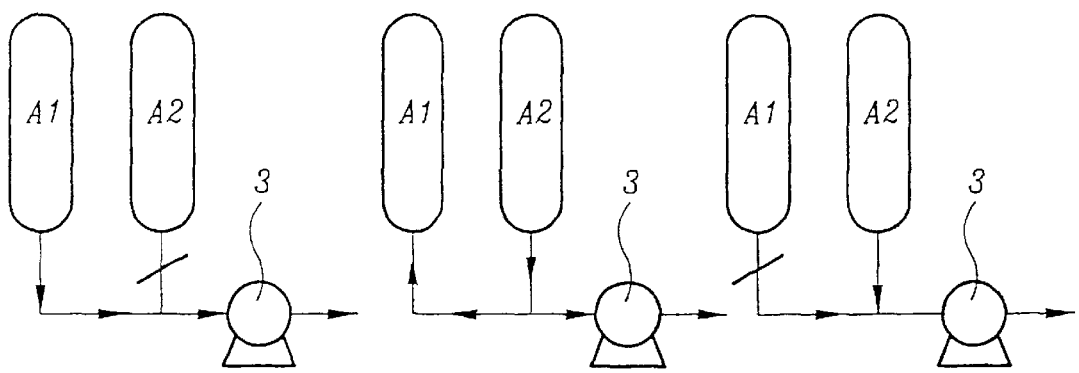
FIG.5　　　　FIG.6　　　　FIG.7

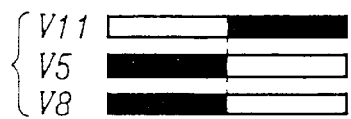
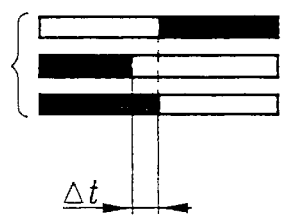
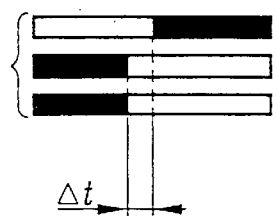
FIG.10     FIG.10A     FIG.10B
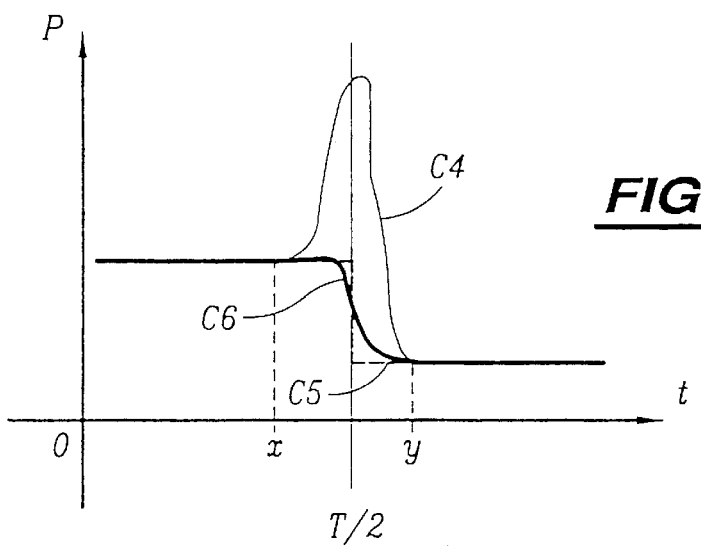
FIG.11
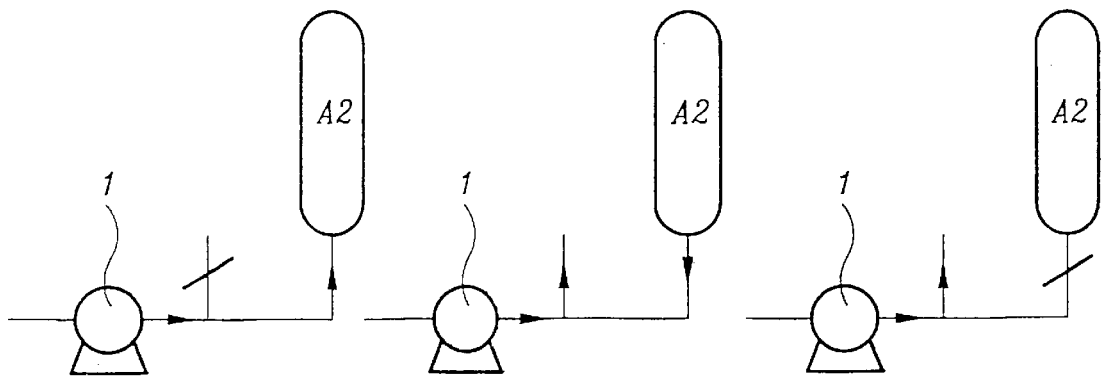
FIG.12     FIG.13     FIG.14

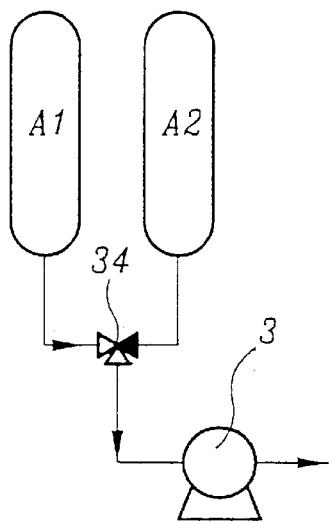
_FIG.23_
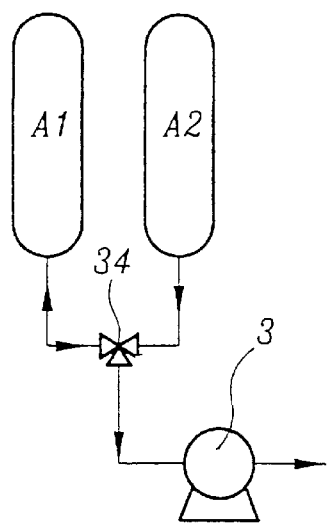
_FIG.24_
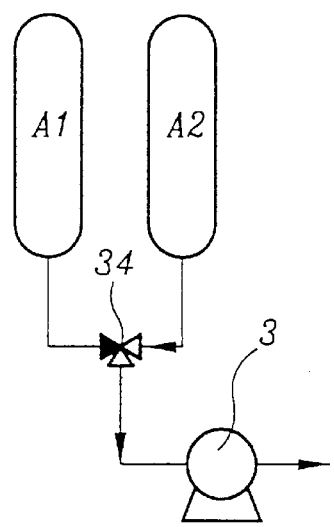
_FIG.25_
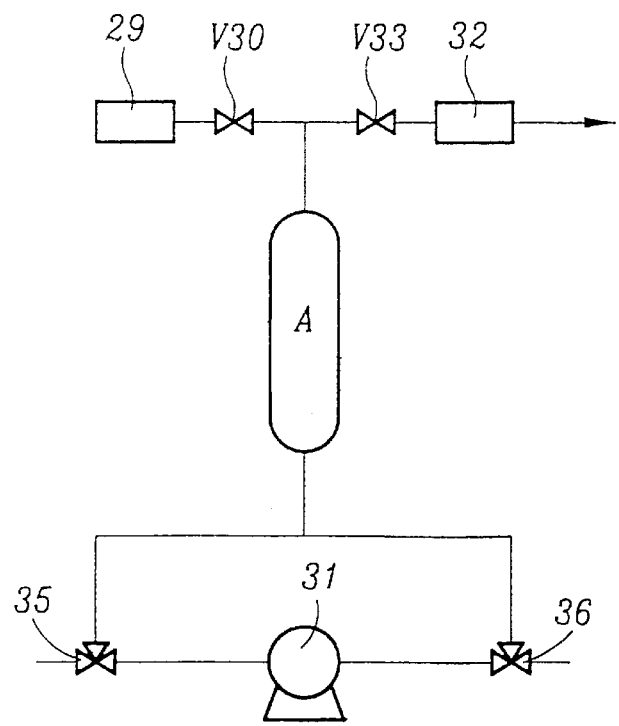
_FIG.26_

PROCESS AND PLANT FOR SEPARATING A GAS MIXTURE BY ADSORPTION

FIELD OF THE INVENTION

The present invention relates to a process for separating a gas mixture by adsorption, by carrying out a pressure variation cycle comprising a succession of steps, in which process, at at least one instant in the cycle, a terminal of a compression machine is switched from a first space which is at a first pressure P1 to a second space which is at a second pressure P2 significantly different from the first pressure P1.

BACKGROUND OF THE INVENTION

The invention applies especially to the production of oxygen from atmospheric air and, in the rest of the description, reference will be made to this application as a preferred example.

The invention may be carried out with all types of adsorption cycles in which there is a pressure variation, for example with the following cycles:

So-called VSA (Vacuum Swing Adsorption) cycles, in which the adsorption takes place substantially at atmospheric pressure and the minimum pressure of the cycle is significantly below this atmospheric pressure and typically at about 250 to 400 mbar. These cycles are generally carried out by means of units consisting of three adsorbers.

Transatmospheric cycles, called MPSA cycles, which differ from the previous ones by the fact that the adsorption takes place at a pressure substantially above atmospheric pressure and typically at about 1.3 to 2 bar. These cycles are generally carried out by means of units consisting of two adsorbers.

So-called PSA (Pressure Swing Adsorption) cycles, in which the adsorption takes place at a pressure significantly above atmospheric pressure, typically at about 3 to 8 bar, while the minimum pressure of the cycle is substantially equal to atmospheric pressure.

In the rest of the description, the acronym PSA will be used as a generic term for all these cycles.

Moreover, the pressures indicated are absolute pressures.

One of the means of reducing the cost of producing oxygen by PSA is to substantially decrease the capital investment, while keeping the energy consumption constant.

Reducing the cycle time falls within this scheme when the system in question allows the performance to be maintained despite more rapid steps. In practice, such a reduction consists in improving the kinetics of the adsorbents proportionately, in maintaining the head losses at their previous level, and preventing any problems of attrition of the adsorbent particles.

Horizontal flow through beds of adsorbents, coupled with the use of adsorbents of small particle size, allows most of these problems to be solved, and recent years have seen an increase in industrial units of this type.

However, it turns out that the cycles used at the present time, these mostly being directly derived from the cycles of longer duration used previously, are in fact penalized by the operation of the machines (air compressor or blower, vacuum pump) during the transient phases corresponding to the transition from one step to the next.

The reason for this is that, as will be shown later, the additional energy consumption associated with these transient phases is low in the case of conventional cycle times, but becomes significant in the case of short cycles.

A first example of these phenomena will be explained with regard to FIG. 1 in the appended drawings, which shows diagrammatically an example of a PSA plant for producing oxygen from atmospheric air.

This plant comprises: a blower 1; three adsorbers A1 to A3; a line 2 for feeding air to the adsorbers, which connects the output side of the blower to the lower ends or inlets of the adsorbers via respective valves V11 to V13; a vacuum pump 3, the output side of which is connected to the ambient atmosphere; a discharge line 4 which connects the intake of the vacuum pump to the inlets of the adsorbers via respective valves V21 to V23; and an oxygen flow line 5 connected to the upper end or outlet of each adsorber via tap-offs in parallel, namely respective tap-offs 6-1 to 6-3 equipped with respective valves V31 to V33 for oxygen production and respective tap-offs 7-1 to 7-3 equipped with respective valves V41 to V43 for repressurizing the adsorbers. Moreover, the line 5 is connected to an oxygen consumption circuit shown diagrammatically at 8.

Moreover, the plant includes control, regulation and electrical-supply means, known per se and not shown, which are designed to carry out the cycle illustrated in FIG. 2.

FIG. 2 is a diagram which illustrates a typical adsorption cycle carried out by means of the plant in FIG. 1.

In FIG. 2, in which time t is plotted on the x-axis and absolute pressure P is plotted on the y-axis, the lines bearing arrows indicate the movements and destinations of the gas streams and, furthermore, the direction of flow through the adsorber—when an arrow is in the direction of increasing y-coordinates (upwards in the diagram), the stream through the adsorber is called a cocurrent stream. If the upwardly pointing arrow lies below the line indicating the pressure in the adsorber, the current enters the adsorber via the inlet end of the adsorber; if the upwardly pointing arrow lies above the line indicating the pressure, the stream leaves the adsorber via the outlet end of the adsorber, the inlet and outlet ends being respectively those of the gas to be treated and of the gas drawn off in the production phase; when an arrow is in the direction of decreasing y-coordinates (downwards in the diagram), the stream through the adsorber is called a countercurrent stream. If the downwardly pointing arrow lies below the line indicating the pressure in the adsorber, the stream leaves the adsorber via the inlet end of the adsorber; if the downwardly pointing arrow lies above the line indicating the pressure, the stream enters the adsorber via the outlet end of the adsorber, the inlet and outlet ends being always those of the gas to be treated and of the gas drawn off in the production phase.

The cycle in FIG. 2, the period T of which is approximately 270 s for example, essentially consists of three successive steps. The cycle will be described below for one adsorber, for example the adsorber A1. In the case of the other adsorbers, the cycle is derived therefrom by a time shift of T/3 and 2T/3 respectively, T denoting the total duration of the cycle.

(a) From t=0 to T/3: a substantially isobaric production step at the high pressure $P_M$ of the cycle, which is close to atmospheric pressure. During this step, air is introduced into the adsorber via the valve V11 and flows from its inlet to its outlet, from where the oxygen produced leaves. Some of this oxygen is tapped off, in order to repressurize another adsorber during a repressurization step (c) described later, and the rest is sent for use at 8.

(b) From T3 to 2T/3, the adsorber is depressurized or purged with a countercurrent by means of the vacuum pump 3, until the low pressure $P_m$ of the cycle is reached, this typically being around 0.25 to 0.40 bar.

(c) From 2T/3 to T, the adsorber is repressurized with a countercurrent up to the pressure $P_M$ by the production oxygen coming from another adsorber in the adsorption step (a).

Looking at the instantaneous energy consumption of the vacuum pump during one step, it may be seen that this consumption increases uniformly as the pressure in the adsorber on which this machine is acting drops below atmospheric, and is then followed by a substantial peak on going over to the following adsorber, which is at a high pressure.

The diagram in FIG. 3, in which time t is plotted on the x-axis and pressure P is plotted on the y-axis, illustrates this variation and allows it to be clearly understood. Thus, near the point where the vacuum pump switches from one adsorber to another, i.e. near the times T/3, 2T/3 and T, the actual curve C1 departs from the theoretical curve C2. More specifically, in this FIG. 3, the time x corresponds to the closure time of the valves V2$i$ (V21 in the example) and the time y corresponds to the opening time of the valves V2(i+1) (V22 in the example). These times are about 0.5 to 2 seconds, depending on the size of the valves.

In practice, during the transient period x, the gas output coming from the adsorber at the end of purging is throttled and the vacuum pump, for a very short time, pumps only on the volume of the vacuum circuit. Since this volume is much smaller than the volume of the adsorbers, the internal pressure in this circuit rapidly drops. Thus, a pressure drop $\Delta P$ of up to 100 mbar below the theoretical low pressure $P_m$ of the cycle has been observed. Since opening the vacuum valve of the following adsorber, which starts only when the vacuum valve of the first adsorber has been completely closed, is not instantaneous either, there is also throttling of the pumped output until the valve has been completely opened (time y).

It follows from this that three times per cycle, during all the transient periods such as (T/3)−x to (T/3)+y, the intake pressure of the vacuum pump is substantially lower than the theoretical pressure (corresponding to the pressure in the adsorbers, less the normal head losses of the vacuum circuit). This results in an additional energy consumption proportional at each instant to the difference (actual P−theoretical P) for the type of machine normally used in these processes, namely usually a Roots-type vacuum pump. This additional energy has been estimated to be approximately 1% of the normal pumping energy for a VSA-type cycle with a cycle time of 3×90 s, a theoretical low pressure of 0.35 bar, for a $\Delta P$ peak of 100 mbar and valve operating times of 1 second.

When the same 3×15 s cycle is carried out, with suitable adsorbents and a suitable adsorber geometry, adsorbers approximately six times smaller than previously are used for the same production, but the other equipment (air blower, vacuum pump and valves) remains generally unchanged. In particular, nothing precludes the size of the valves V21, V22 and V23 being different from that of the valves used for the 3×90 s cycle.

The valve operating time remains unchanged and the phenomenon described above, with the low-pressure peak and the overconsumption peak, occurs again. However, because the adsorbers are of smaller size, the plant for the 3×15 s unit is more compact, the pipework is shorter and the volume of the vacuum circuit tends to be smaller. The effects described above therefore tend to be amplified.

Assuming even that they are identical, their relative importance is significantly more substantial in the short-cycle case. The period of overconsumption thus represents 2 s over 15 s, instead of 2 s over 90 s previously. With the same assumptions as previously, this additional energy expenditure may thus represent up to 8% of the energy consumption of the vacuum pump in the case of the 3×15 s cycle.

It may therefore be seen that the effect in question, although relatively secondary in the case of the usual cycles, becomes important in the case of short cycles, and that it is necessary to remedy this in order to improve the energy performance of the latter.

As will be seen later, a similar problem arises in many other types of PSA cycles during switching of the compression and/or suction machines from one adsorber to another, from an adsorber to atmosphere or from atmosphere to an adsorber.

SUMMARY OF THE INVENTION

The object of the invention is to eliminate, or at least reduce significantly, the additional energy expenditure during these transient phases.

For this purpose, the subject of the invention is a process for separating a gas mixture, especially atmospheric air, by adsorption, by carrying out a pressure variation cycle comprising a succession of steps, in which process, at at least one instant in the cycle, a terminal of a compression machine is switched from a first space which is at a first pressure P1 to a second space which is at a second pressure P2 significantly different from the first pressure P1, characterized in that, during the switching, the terminal is brought simultaneously into communication with the first space and with the second space.

The process according to the invention may include one or more of the following characteristics:

- the duration of the intermediate operation is at most equal to one third, and preferably between ⅓ and ⅕₀th of the shorter of the steps of the cycle that it connects;
- one of the spaces is a volume of gas mixture to be separated, typically the ambient air;
- at least one of the spaces is a gas storage tank;
- at least one of the spaces is a first adsorber which, during the said intermediate operation, communicates with the machine via one of its ends;
- during the intermediate operation, the first adsorber is also brought into communication with a third space via its other end;
- the third space is another adsorber which is at a pressure different from that of the first adsorber;
- the machine is an air compressor or blower, or a vacuum pump, with a single function;
- the machine is designed to operate as an air compressor or as a vacuum pump, depending on the steps of the cycle;
- the switching takes place by closing a first two-way valve and opening a second two-way valve, and the intermediate operation takes place by opening the second two-way valve before closing the first two-way valve;
- the switching takes place by closing a first way of a three-way valve and opening a second way of this three-way valve, the third way of this three-way valve being open, and the intermediate operation taking place by opening the second way of the three-way valve before closing the first way.

The subject of the invention is also a plant for separating a gas mixture, especially atmospheric air, by adsorption, comprising at least one adsorber and means for implementing a pressure variation cycle in it, these means comprising a compression machine and means for selectively connecting at least one terminal of this machine to a first space and to a second space, characterized in that it comprises control means which, at certain predetermined instants, bring the terminal simultaneously into communication with the first space and with the second space.

This plant may include one or more of the following characteristics:
- the selective connection means comprise two two-way valves and the control means are designed to open the two two-way valves at the predetermined instants simultaneously;
- the selective connection means comprise a three-way valve and the control means are designed to open the three ways of this three-way valve simultaneously.

BRIEF DESCRIPTION OF THE DRAWINGS

Examples of implementation of the invention will now be described with reference to the appended drawings, in which:

FIG. 4 is a diagram which illustrates the switching of the valves during a transient phase, in the case of FIG. 2;

FIGS. 4A and 4B are similar diagrams which correspond to FIGS. 2A and 2B respectively;

FIGS. 5 to 7 are partial diagrammatic views which illustrate a transient phase according to the invention in a different way;

FIG. 10 is a diagram similar to FIG. 4, which illustrates the switching of the valves during a transient phase of the compressor, in the cycle of FIG. 9;

FIGS. 10A and 10B are similar diagrams, corresponding respectively to two modifications of the cycle according to the invention;

FIG. 11 is a similar diagram to FIG. 3, which illustrates the overconsumption phenomenon of the compressor during the transient phases in the cycle of FIG. 9, as well as the improvement offered by the invention;

FIGS. 12 to 14 are diagrammatic views similar to FIGS. 5 to 7, but corresponding to the plant in FIG. 8;

FIGS. 17A to 19A are similar views, corresponding to the implementation of the invention;

FIGS. 20A to 22A are similar views, corresponding to the implementation of the invention;

FIGS. 23 to 25 are partial diagrammatic views which illustrate the use of a three-way valve for switching the vacuum pump according to the invention, in the case of the plant in FIG. 8; and FIG. 26 represents the use of two three-way valves in the plant in FIG. 15 for implementing the invention.

DETAILED DESCRIPTION OF THE INVENTION

For ease of understanding the explanation, the reader should now refer to FIGS. 4, 4A, 4B in which the open state of the valves is represented by the white bar and their closed state by the black bar. In the conventional technique, for example in a plant consisting of two adsorbers, and considering, for example, the adsorber A1, the purging step (b) takes place from T3 to 2T/3 with the valve V21 open while the valves V22 and V23 are closed. At time 2T/3, to within the times x and y, V21 is closed and V22 is opened (FIG. 4).

According to one aspect of the invention, the valve V22 is opened before the time 2T/3 namely at a time t1 which is Δt before 2T/3. The sequence is then that illustrated in FIGS. 5 to 7:

From T/3 to t1 (FIG. 5), the vacuum pump 3 is connected only to the adsorber A1. At time t1, the pressure in A1 is substantially $P_m$, while the adsorber A2, which terminates the production step (a) is at the high pressure $P_M$.

From t1 to 2T/3 (FIG. 6), the vacuum pump is connected to both of the adsorbers A1 and A2. There is therefore a short countercurrent decompression of A2, simultaneously towards A1, which therefore undergoes a short first countercurrent repressurization, and towards the vacuum pump. This short repressurization is essentially carried out with the air contained in the inlet zone of the adsorber A2, i.e. in the free distribution volume lying upstream of the adsorbents and in the free spaces in the first bed (or in the first zone in the case of a single bed) serving to stop water and the $CO_2$ in the water. The research carried out by the Applicant has made it possible to demonstrate that this partial air repressurization had no negative impact on the performance of the cycle.

After time 2T/3, the vacuum pump is connected only to the adsorber A2, which is thus purged.

It may therefore be seen that the intake of the vacuum pump is permanently connected to at least one adsorber, including during the phases of switching from one adsorber to another. In other words, the vacuum pump at any instant does not pump on the discharge line 4 alone, and its intake is permanently at a pressure close to the theoretical pressure corresponding to the valves being operated infinitely rapidly.

Figure 3:
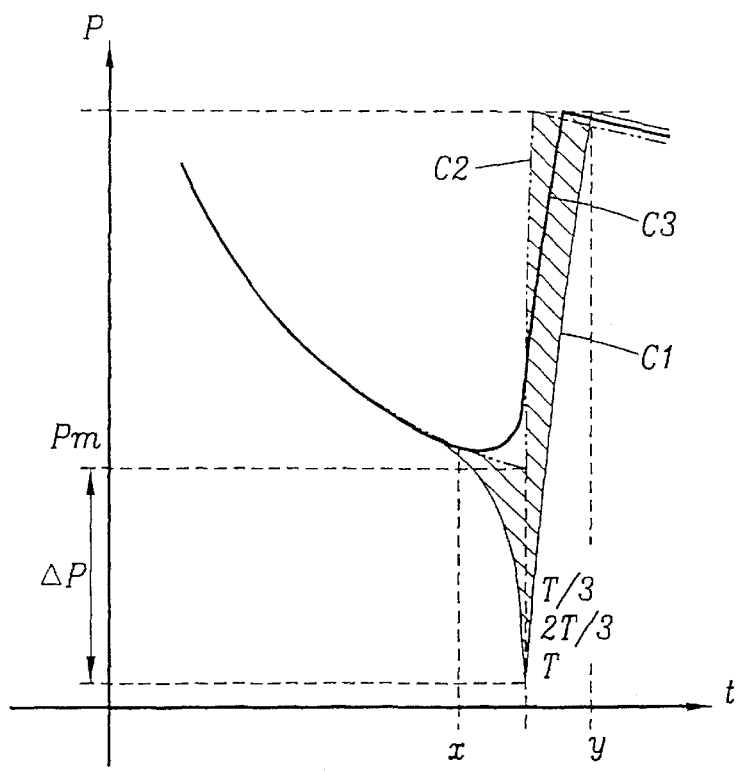
FIG. 3 is a diagram which illustrates the pressure variation at the intake of the vacuum pump, in the case of the known cycle and in that of a cycle according to the invention.

As a result, the underpressure peak ΔP in curve C1 in FIG. 3 is practically eliminated and the actual pressure curve becomes curve C3, which is very close to the theoretical curve, C2.

Figure 2:
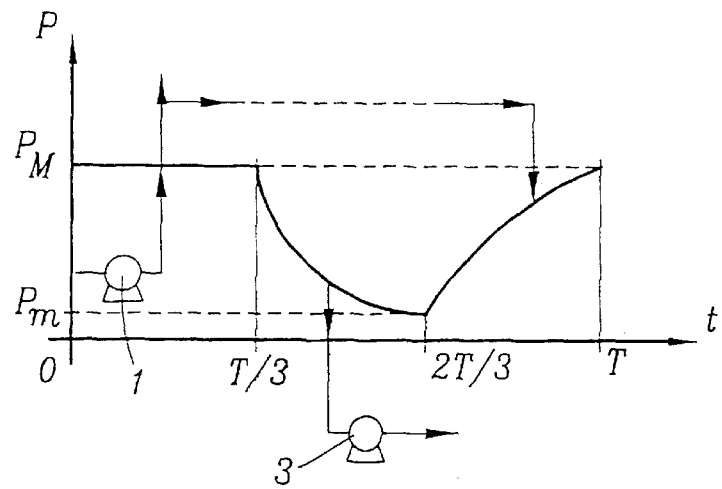
FIG. 2 is a diagram illustrating a known cycle carried out by means of this plant.

The modification of the cycle of FIG. 2 described above is illustrated in FIG. 2A: from t1 to 2T/3, a short additional step of a first cocurrent repressurization by means of gas coming from another adsorber at the end of the production step (a) has been introduced. The latter is therefore terminated by a short additional step, of the same duration Δt, in which air passes from the inlet of the other adsorber to that of the adsorber in question.

Figure 2A:
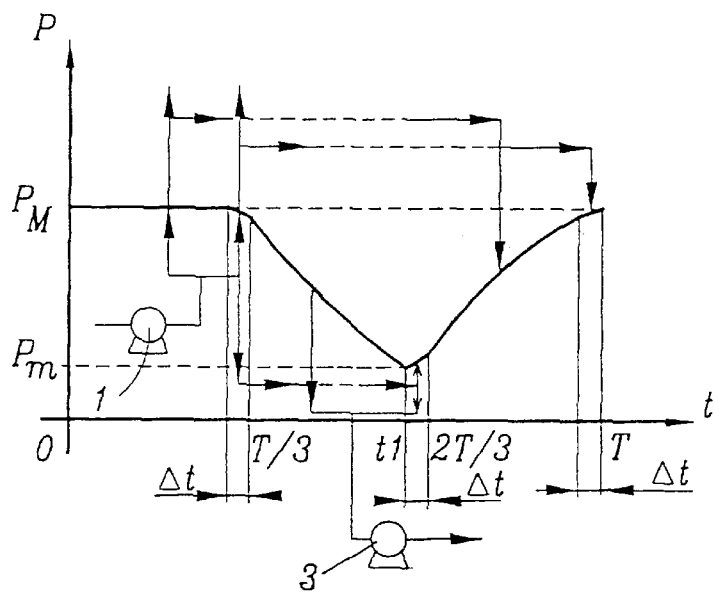
FIG. 2A is a diagram similar to FIG. 2, illustrating a first modification of the cycle according to the invention.

The cycle of FIG. 2A corresponds to the case in FIG. 4A, in which the valve V41 is opened at time 2T/3, as in the known cycle, in order to start the repressurization step (c) at that moment.

Figure 2B:
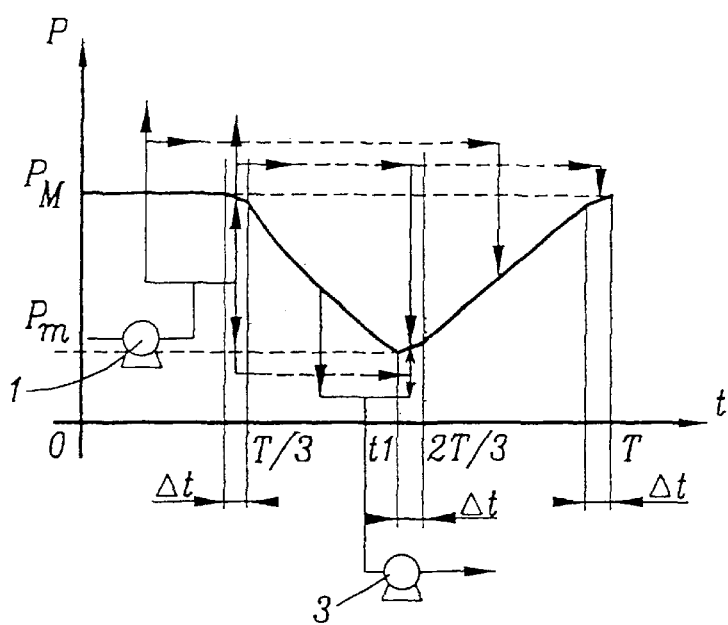
FIG. 2B is a similar diagram illustrating a second modification of the cycle according to the invention.

As a variant (FIGS. 4B and 2B), the valve V41 may also be opened before 2T/3, in particular at t1. The countercurrent repressurization with oxygen then starts in A1 simultaneously with the first cocurrent repressurization with air. This makes it possible to limit the negative effects that may arise, depending on the cycle, from introducing air into an adsorber at too low a pressure with regard to the advance of the impurity front into the adsorbents.

FIGS. 5 to 7 illustrate diagrammatically the sequence of corresponding operations, which may be immediately understood from examination of these figures and from the above explanations.

Figure 8:
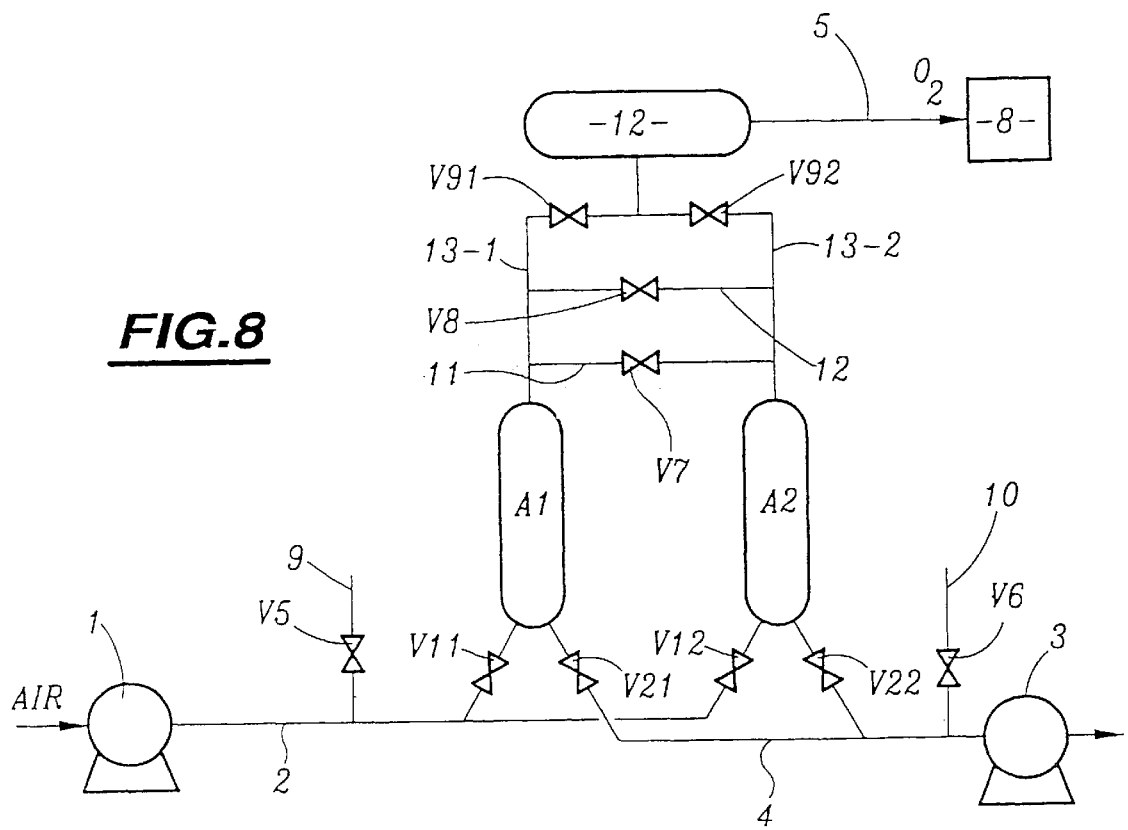
FIG. 8 is a diagrammatic view of a plant consisting of two adsorbers for the production of oxygen from atmospheric air.

The plant shown by way of example in FIG. 8 is of the MPSA type, consisting of two adsorbers A1 and A2. This figure again shows the elements 1 to 4, V11, V12, V21, V22 and 8 of FIG. 1, except that here the blower is replaced by a compressor allowing oxygen to be produced at a high pressure $P_M$ which is significantly above atmospheric pressure.

The plant also includes a tap-off 9 equipped with a valve V5, for venting the output side of the compressor 1, and a tap-off 10 equipped with a valve V6, for venting the intake of the vacuum pump 3. The upper outlets of the adsorbers are connected in parallel by a balancing line 11 fitted with a valve V7 and by an eluting line 12 fitted with a valve V8. In addition, these outlets are connected to a buffer tank 12 by respective lines 13-1 and 13-2 equipped with respective valves V91 and V92. The tank 12 allows oxygen to be produced continuously at the pressure $P_M$.

Figure 9:
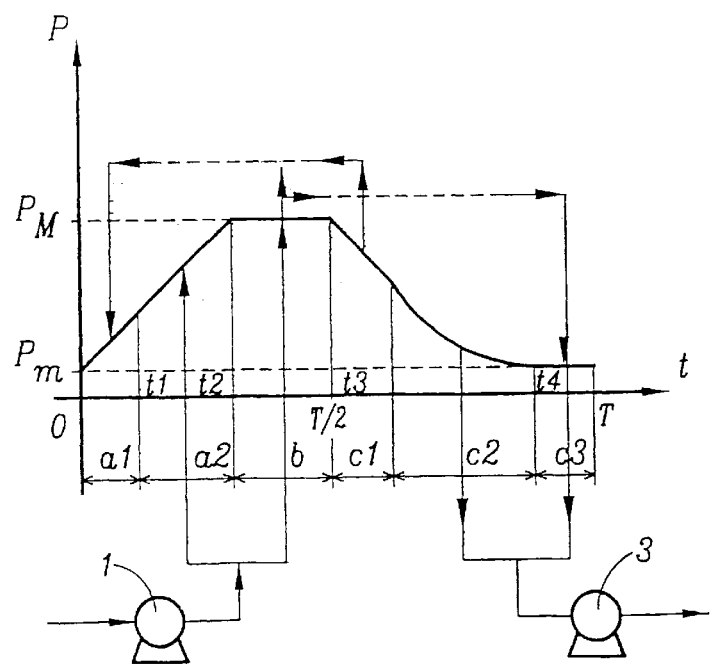
FIG. 9 is a diagram similar to FIG. 2, which illustrates a known cycle carried out by means of the plant in FIG. 8.

FIG. 9 shows, in a similar manner to FIG. 2, a conventional cycle implemented by means of this plant between the high pressure $P_M$, typically about 1.5 bar, and a low pressure $P_m$, typically about 400 mbar.

This cycle, which will be described in the case of the adsorber A1 and which, in the case of the adsorber A2, may be derived by a T/2 time shift, comprises in succession the following main steps:

(a1) From time 0 to time t1, a step of first countercurrent recompression by pressure balancing with the other adsorber during step (c1) of first cocurrent decompression.

(a2) From t1 to t2<T/2, a step of final cocurrent recompression by means of atmospheric air.

(b1) From t2 to T/2, a production step, during which air is introduced into the inlet of the adsorber and production oxygen is drawn off from its outlet. During this step, which is approximately isobaric at the high pressure $P_M$, production oxygen is removed and sent to the outlet of the other adsorber during the purging/eluting step (c3) described below.

(c1) From T/2 to t3, a step of first cocurrent decompression by pressure balancing with the other adsorber during step (a1) described above.

(c2) From t3 to t4<T, a step of countercurrent decompression by pumping down to the low pressure $P_m$ of the cycle.

(c3) From t4 to T, an approximately isobaric purging/eluting step, during which production oxygen is introduced into the outlet of the adsorber while the countercurrent pumping is continued.

A constant stream of oxygen is drawn off from the tank 12 as production output.

During each of steps (a1) and (c1), the air compressor 1 is not used. The compressed stream is vented via the valve VS. The energy consumption of the machine is then minimal.

However, an energy overconsumption is observed when passing from step (b) to step (c1), for reasons similar to those explained above.

A rapid recording of the pressure shows that there is a high-pressure peak during this transient phase. Thus, as shown in FIG. 11, the curve of the actual pressure C4, again departs from the theoretical pressure C5, with the same disadvantages as previously (energy overconsumption and greater mechanical load).

This is because the normal sequence (FIG. 10) consists in closing the valve V11 and then opening the valve V5. Consequently, the line 2, which has a small volume compared with the adsorbers, is compressed to a pressure greater than the normal operating pressure.

For the same reasons as previously, this phenomenon becomes increasingly important when the cycle time is reduced substantially.

According to one aspect of the invention, the valve V5 is opened before the valve V11 is closed, as shown in FIG. 10A. Having done this, the adsorber A1 at the high pressure of the cycle is brought into communication for a short period Δt with the atmospheric pressure. Thus, a short step of first countercurrent partial depressurization of the adsorber A1 is created.

The corresponding sequence of flows of the streams is illustrated in FIGS. 12 to 14.

The curve of the delivery pressure of the air compressor then becomes curve C6 in FIG. 11, this being virtually devoid of any pressure peak.

It will be understood that similar phenomena, and a corresponding remedy, may be described with respect to the switching operations of the V5-V12, V21-V6 and V6-V22 type.

FIGS. 15 to 22A illustrate the application of the invention to a plant of the single-adsorber type. This plant (FIG. 15) essentially comprises: a single adsorber A; a compression machine 21 with a single direction of rotation, forming both an air compressor and a vacuum pump; an air inlet line 22 connected to a terminal 23 of the machine 21 and equipped with a valve V22; a discharge line 24 connected to the other terminal 25 of the machine and equipped with a valve V24; a line 26 equipped with a valve V26, connecting the terminal 23 to the lower inlet 27 of the adsorber; a line 28 equipped with a valve V28, connecting the terminal 25 to the inlet 27; an eluting tank 29; an eluting line 30 equipped with a valve V30 and connecting the tank 29 to the upper outlet 31 of the adsorber; a production tank 32; and a production line 33 equipped with a valve V33 and connecting the tank 32 to the outlet 31.

Figure 15:
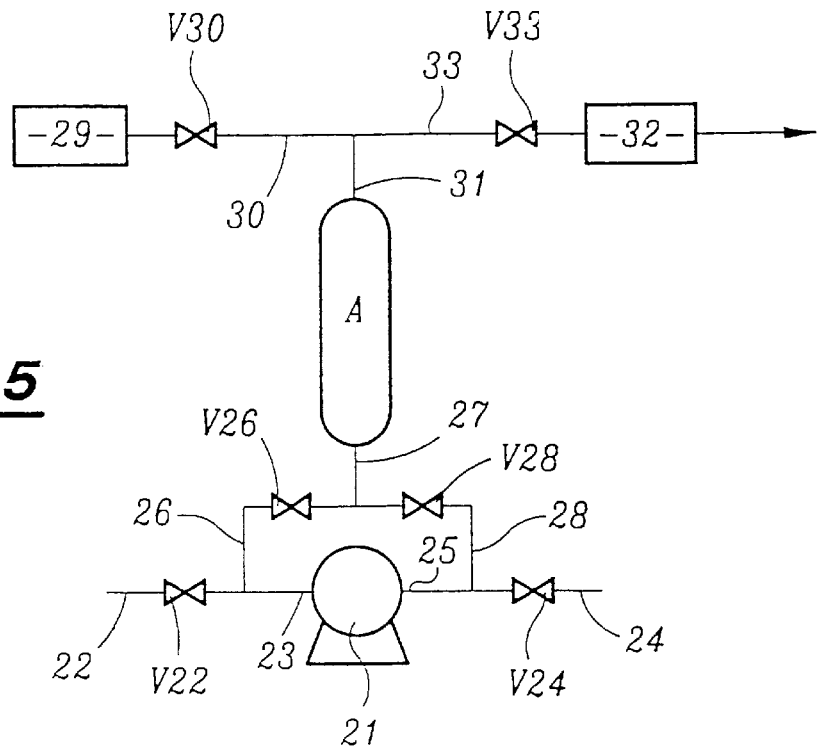
FIG. 15 shows diagrammatically a plant of the single-adsorber type for the production of oxygen from atmospheric air.
Figure 16:
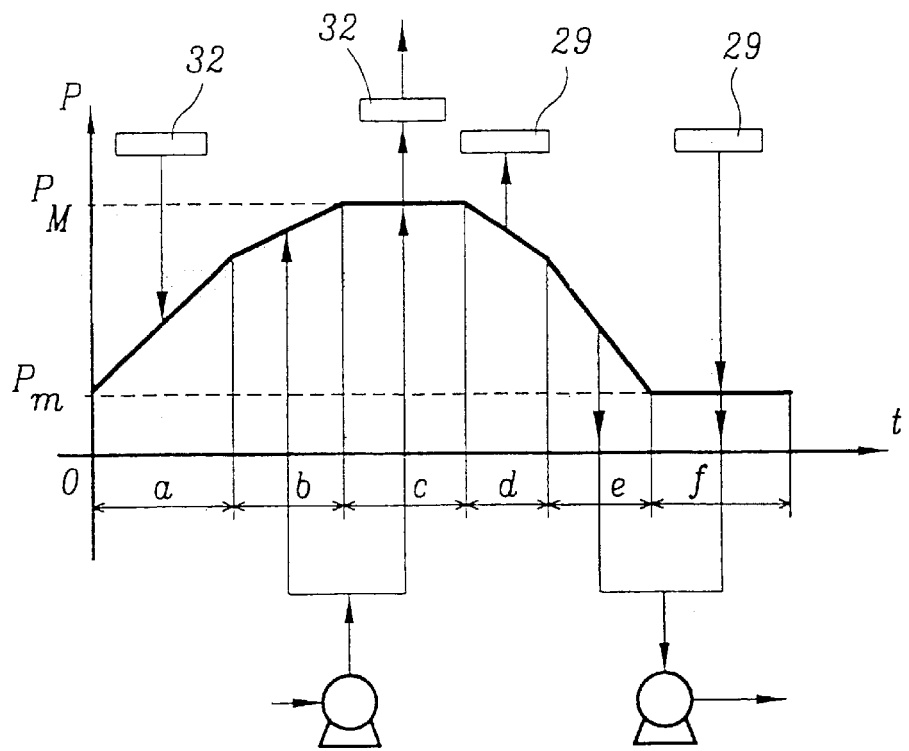
FIG. 16 is a diagram similar to FIG. 2, which illustrates a known cycle carried out by means of the plant in FIG. 15.

FIG. 16 illustrates in the same way as previously the cycle implemented by means of the plant in FIG. 15. This cycle comprises, in succession, the following steps:

(a) A step of first countercurrent recompression by means of oxygen drawn off from the tank 32.

(b) A step of final cocurrent repressurization by means of atmospheric air.

(c) An approximately isobaric production step at the high pressure $P_M$ of the cycle. During this step, production oxygen is sent to the tank 32.

(d) A step of first cocurrent decompression, the gas coming from the adsorber being sent to the tank 29.

(e) A step of final countercurrent decompression by pumping down to the low pressure $P_m$ of the cycle.

(f) An approximately isobaric purging/eluting step during which oxygen is sent to the outlet of the adsorber from the tank 29, while the countercurrent pumping continues.

A constant stream of oxygen is drawn off from the tank 32 as production output.

Figure 17:
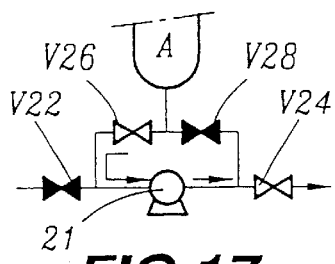
FIGS. 17 to 19 are partial diagrammatic views which illustrate, in a different way, the conventional switching of the valves at the end of the purge/elution phase.

It should be pointed out that, during step (a) of countercurrent recompression and step (d) of cocurrent decompression, the machine 21 is not involved in the cycle. It is then vented via the line 24. To do this, the operation of passing from step (f) to step (a) conventionally takes place as illustrated in FIGS. 17 to 19, where the valves are shown in white when they are open and in black when they are closed:

During step (f), the valves V26 and V24 are open, while the valves V22 and V28 are closed (FIG. 17). Then the valve 26 is closed (FIG. 18) and then the valve 24 is opened, thereby venting the machine 21 (FIG. 19).

Figure 18:
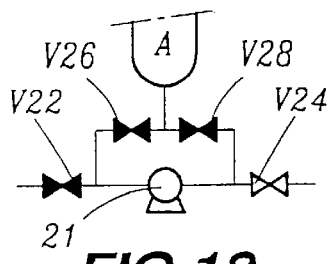
Figure 19:
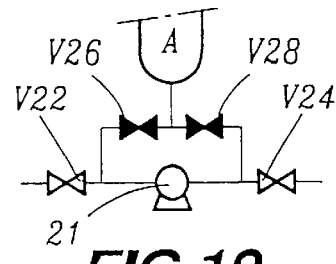
Figure 17A:
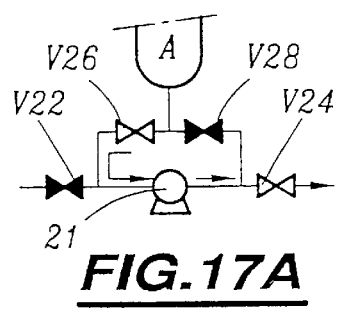
Figure 18A:
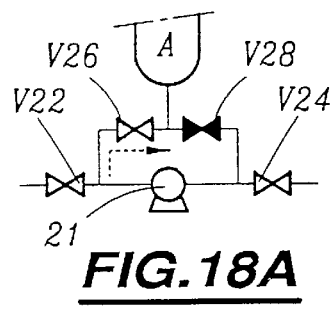
Figure 19A:
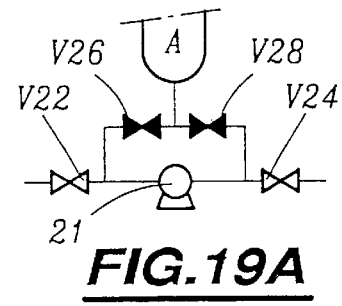

The underpressure peak appearing during the intermediate phase in FIG. 18 is virtually eliminated, together with the corresponding drawbacks, by opening the valve V22 (FIG. 18A) before the valve V26 is closed (FIG. 19A). This thus initiates cocurrent repressurization of the adsorber which has just been purged at the low pressure of the cycle, as illustrated by the dot-dash line in FIG. 18A.

Figure 20:
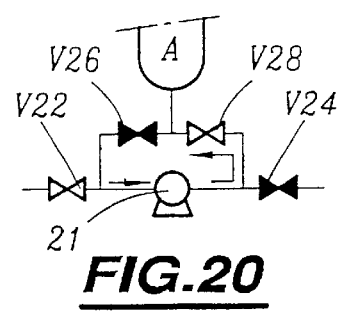
FIGS. 20 to 22 are views similar to FIGS. 17 to 19 respectively, illustrating the conventional switching of the valves at the end of the adsorption phase.
Figure 21:
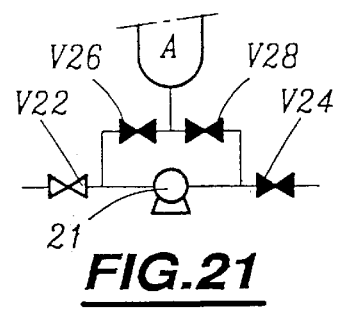
Figure 22:
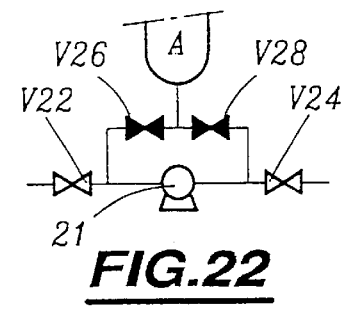
Figure 20A:
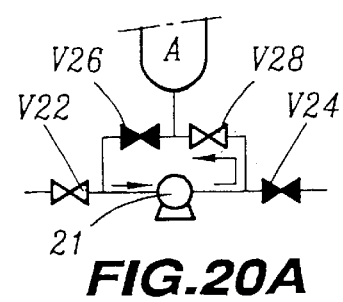

Likewise, FIGS. 20 to 22 illustrate the conventional passage from step (c) to step (d):

During step (c), the valves V22 and V28 are open and the valves V26 and V24 are closed (FIG. 20). Next:

the valve V28 is closed (FIG. 21) and then the valve V24 is opened, thereby venting the machine 21 (FIG. 22).

Figure 21A:
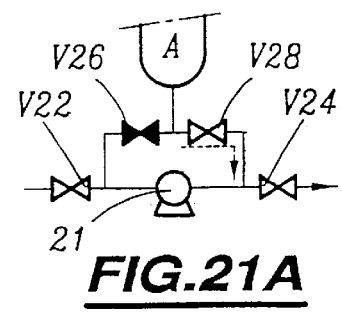
Figure 22A:
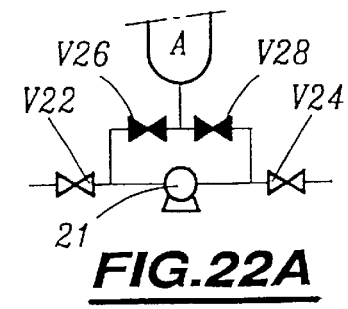

Likewise, the pressure peak appearing during the intermediate phase in FIG. 18 is virtually eliminated, together with the corresponding drawbacks, by opening the valve V24 (FIG. 21A) before the valve V28 is closed (FIG. 22A). This thus initiates countercurrent depressurization of the adsorber at the high pressure $P_M$, as illustrated by the dot-dash lines in FIG. 21A.

The method of operating the valves that has been described above in the case of several cycles and particular plants may apply to any PSA, MPSA or PSA units consisting of any number of adsorbers N≧1. In general, it may be used to avoid any overconsumption of energy when switching a compression machine (compressor, blower or vacuum pump) from one adsorber to another adsorber or from one adsorber to the ambient atmosphere, or vice versa.

This operating method may be carried out by means of a three-way valve, as shown in FIGS. 23 to 25 in the case of switching a vacuum pump from an adsorber A1 (FIG. 23) to another adsorber A2 (FIG. 25). To do this, during an intermediate switching step, the three ways of the valve are opened (FIG. 24).

FIG. 26 likewise illustrates the use of two three-way valves in the case of the plant in FIG. 15, for switching the machine 21 between the adsorber and the ambient atmosphere, instead of, on the one hand, the valves V22 and V26 (three-way valve 35) and, on the other hand, the valves V24 and V28 (three-way valve 36).

In these variants, the term "three-way valve" should be understood to mean any type of fluid distributor allowing, in one of its service positions, the three spaces that it connects to be simultaneously brought into communication with each other and, in two other service positions, allowing one of these three spaces to be brought into communication with one or other of the two other spaces.

Such a distributor may especially consist of a three-way valve proper, or of a three-way distributor with a sliding or rotary valve.

Figure 1:
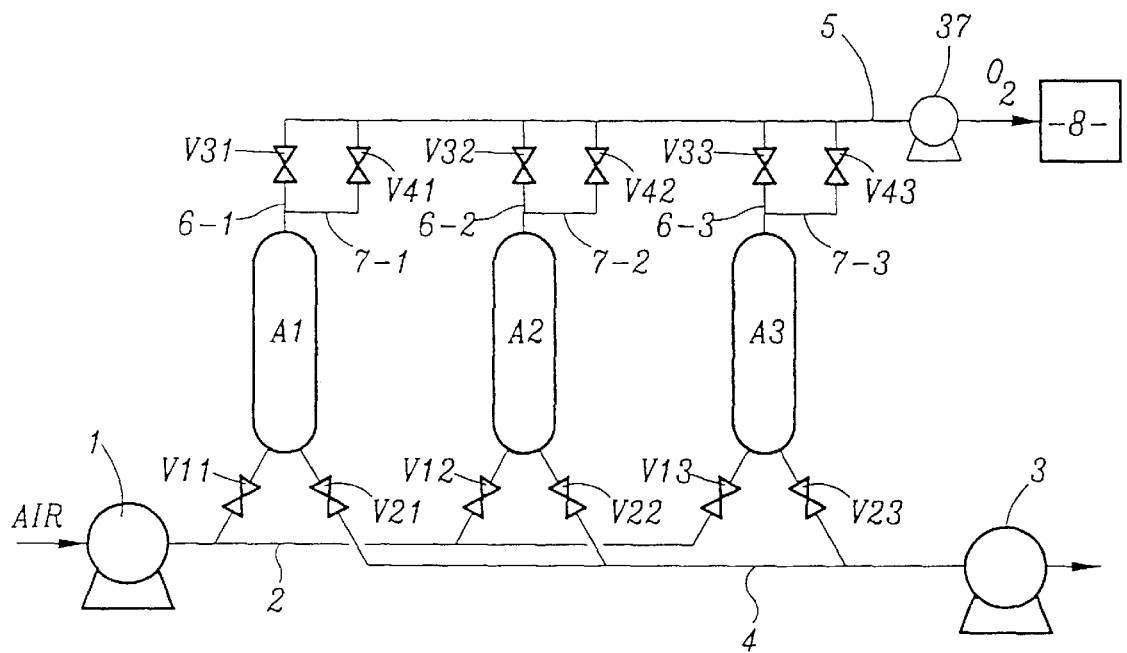
FIG. 1 shows diagrammatically a VSA plant consisting of three adsorbers for the production of oxygen from atmospheric air.

The opening/closing sequences of the invention may also be beneficially applied, although for other reasons, to the switching of an oxygen compressor 37, for example like the one shown in FIG. 1, from one adsorber to another by operating the valves V4$i$. In this case, opening the second production valve beforehand prevents depressurization of the intake of this compressor, and therefore any risk of air and moisture getting into the oxygen circuit.

As a variant, in each case, there may, in the context of the invention, be a slight overlap in the opening/closing times between the valves or ways involved in the invention, the essential point being that the second valve or way in question starts to be opened before the other valve or way in question has been fully closed.

What is claimed is:

1. Process for separating a gas mixture by adsorption, by carrying out a pressure variation cycle comprising a succession of steps, in which process, at at least one instant in the cycle, a terminal of a compression machine is switched from a first space which is at a first pressure P1 to a second space which is at a second pressure P2 significantly different from the first pressure P1, and wherein the switching comprises an intermediate operation in which said terminal is brought simultaneously into communication with the first space and with the second space.

2. The process according to claim 1, wherein the duration of said intermediate operation is at most equal to one third of the shorter of the steps of the cycle that it connects.

3. The process according to claim 2, wherein the duration of said intermediate operation ranges between ⅓ and ⅕₀th of the shorter of the steps of the cycle that it connects.

4. The process according to claim 1, wherein one of the spaces is a volume of said gas mixture.

5. The process according to claim 1, wherein at least one of the spaces is a gas storage tank.

6. The process according to claim 1, wherein at one of the spaces is a first adsorber which, during said intermediate operation, communicates with the machine via one of its ends.

7. The process according to claim 6, wherein during said intermediate operation, said first adsorber is also brought into communication with a third space via its other end.

8. The process according to claim 7, wherein said third space is another adsorber which is at a pressure different from that of said first adsorber.

9. The process according to claim 1, wherein the machine is an air compressor or blower, or a vacuum pump, with a single function.

10. The process according to claim 1, wherein the machine is designed to operate as an air compressor or as a vacuum pump, depending on the steps of the cycle.

11. The process according to claim 1, wherein the switching takes place by closing a first two-way valve and opening a second two-way valve, and said intermediate operation takes place by opening the second two-way valve before closing the first two-way valve.

12. The process according to claim 1, wherein the switching takes place by closing a first way of a three-way valve and opening a second way of said three-way valve, the third way of said three-way valve being open, and said intermediate operation taking place by opening the second way of the three-way valve before closing said first way.

13. The process according to claim 1, wherein the gas mixture to be separated is atmospheric air.

14. Plant for separating a gas mixture by adsorption, comprising at least one adsorber and means for implementing a pressure variation cycle in it, said means comprising at least one compression machine; selective connection means for selectively connecting at least one terminal of the machine to a first space and to a second space; and control means for placing, at certain predetermined instants, the terminal simultaneously in communication with the first space and with the second space.

15. The plant according to claim 14, wherein said selective connection means comprise two two-way valves and said control means are designed to open the two two-way valves at the predetermined instants simultaneously.

16. The plant according to claim 14, wherein said selective connection means comprise a three-way valve and said control means are designed to open the three ways of said three-way valve simultaneously.

* * * * *